US008782054B2

(12) United States Patent
Anderson et al.

(10) Patent No.: US 8,782,054 B2
(45) Date of Patent: Jul. 15, 2014

(54) METHOD AND SYSTEM FOR SELF-ADAPTING CLASSIFICATION OF USER GENERATED CONTENT

(75) Inventors: Robert Anderson, Duvall, WA (US); Benjamin W. Smith, Redmond, WA (US); Julien J. Ellie, Redmond, WA (US); Elizabeth N. Aoki, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1327 days.

(21) Appl. No.: 12/174,837

(22) Filed: Jul. 17, 2008

(65) Prior Publication Data

US 2010/0017386 A1   Jan. 21, 2010

(51) Int. Cl.
*G06F 17/30*   (2006.01)

(52) U.S. Cl.
USPC ........................................ 707/748; 705/26.35

(58) Field of Classification Search
CPC .............. H04N 21/4756; H04N 21/84; G06F 17/30038; G06Q 30/0631
See application file for complete search history.

(56) References Cited

U.S. PATENT DOCUMENTS

| 6,675,159 | B1* | 1/2004 | Lin et al. ................................. 1/1 |
| 7,433,832 | B1* | 10/2008 | Bezos et al. .................. 705/26.8 |
| 2005/0131918 | A1 | 6/2005 | Hillis et al. |
| 2005/0251399 | A1* | 11/2005 | Agarwal et al. .................... 705/1 |
| 2006/0184608 | A1 | 8/2006 | Williams |
| 2006/0242139 | A1* | 10/2006 | Butterfield et al. ................ 707/5 |
| 2006/0242309 | A1* | 10/2006 | Damick et al. ................. 709/229 |
| 2007/0005683 | A1 | 1/2007 | Omidyar |
| 2007/0078832 | A1* | 4/2007 | Ott et al. ............................ 707/3 |
| 2007/0106627 | A1* | 5/2007 | Srivastava et al. ............... 706/20 |
| 2007/0118802 | A1* | 5/2007 | Gerace et al. ............... 715/738 |
| 2007/0179835 | A1 | 8/2007 | Ott, IV |
| 2007/0204287 | A1* | 8/2007 | Conradt et al. ................. 725/28 |
| 2007/0208613 | A1* | 9/2007 | Backer ............................ 705/10 |
| 2007/0255753 | A1 | 11/2007 | Pomerantz |
| 2008/0004944 | A1* | 1/2008 | Calabria ......................... 705/10 |
| 2008/0040748 | A1* | 2/2008 | Miyaki ............................ 725/46 |
| 2008/0091549 | A1* | 4/2008 | Chang et al. .................... 705/26 |

(Continued)

FOREIGN PATENT DOCUMENTS

WO   WO 2007135436 A1   11/2007

OTHER PUBLICATIONS

Marathe, J., "Creating Community Online", http://unpan1.un.org, Mar. 24, 2002, 11 pages.

(Continued)

*Primary Examiner* — Daniel Kinsaul
(74) *Attorney, Agent, or Firm* — Tony Azure; Andrew Sanders; Micky Minhas (57) ABSTRACT

A self-adapting classification system ("SACS") generates an evolving classification for content. The classification may start with a seed review process, which generates a level of trust for initial reviews of the content. Once the seed review is completed and distributed, users may submit content reviews to the self adapting classification system. Using the SACS, users may identify themselves with one or more community groups, which indicate certain shared values and preferences with respect to other members of the same community group. Content reviews received by the SACS may comprise a user identifier pertaining to the submitting user, a content descriptor and an associated classification.

15 Claims, 9 Drawing Sheets

(56) References Cited

U.S. PATENT DOCUMENTS

| | | |
|---|---|---|
| 2008/0098005 A1 | 4/2008 | Goradia |
| 2008/0133488 A1* | 6/2008 | Bandaru et al. ............. 707/3 |
| 2008/0172689 A1* | 7/2008 | Feder et al. ............. 725/28 |
| 2008/0201348 A1* | 8/2008 | Edmonds et al. ............. 707/101 |
| 2008/0320568 A1* | 12/2008 | Hawkins et al. ............. 726/5 |
| 2009/0144254 A1* | 6/2009 | O'Sullivan et al. ............. 707/5 |
| 2009/0150786 A1* | 6/2009 | Brown ............. 715/733 |
| 2009/0216608 A1* | 8/2009 | Bechtel ............. 705/10 |

OTHER PUBLICATIONS

Center for Communication & Civic Engagement, "Trust Building Online: Rating and Reputation Systems", http://depts.washignton.edu/ccce/digitalMedia/reps.html, May 6, 2008, 4 pages.

XBox LIVE Community Games, Xbox.com, Calendar of Events, May 6, 2008, http://www.xbox.xom/en-US/Community/events, 2 pages.

Hawkins, Dax, U.S. Appl. No. 11/766,072 with attached drawings filed Jun. 20, 2007.

* cited by examiner

"Blood" or "Violence<=6

| Content Name | Community Group | Content Descriptor | Aggregate Classification |
|---|---|---|---|
| Blood Puzzle | Gamers Of Nevada | "Blood" | 4 |
| Blood Puzzle | Sammamish Moms | "Blood" | 6 |
| Dingo Dinosaur | Whirly Birds | "Violence" | 2 |
| Politico | Liberators | "Violence" | 1 |

"Blood" and "Mature"<=9 or "Violence"<3

| Content Name | Community Group | Content Descriptor | Aggregate Classification |
|---|---|---|---|
| Monkey Shine | Washington Knights | "Blood", "Mature" | 4, 7 |
| Rats Feast | Gamers Of Paris | "Blood", "Mature" | 3, 8 |
| Dingo Dinosaur | Whirly Birds | "Violence" | 2 |
| Politico | Liberators | "Violence" | 1 |

METHOD AND SYSTEM FOR SELF-ADAPTING CLASSIFICATION OF USER GENERATED CONTENT

BACKGROUND

The Internet and World Wide Web have become a ubiquitous source for the distribution of digital content. Digital content may include text, graphics, audio, video, movies, computer software such as video games, etc. It is important for users to be able to determine the nature of content they may desire to download. For example, when a user decides to download content, it is often difficult for the user to know whether the content is suitable based on the user's individual preferences and sensitivities. Thus, it is desirable to provide content reviews that users can review before downloading and purchasing digital content.

A number of known systems allow users to submit content reviews and peruse them before downloading and purchasing content. There are several significant limitations with conventional system. First, it may be difficult for users to gain a significant level of trust for content reviews because they do not know the nature of the users submitting the reviews nor may there be a peer review process to insure integrity of the reviews.

A second related limitation is that known systems do not allow users to submit and search for content reviews using a fine level of granularity that is specific to a particular group and/or community standard to which users may identify. That is, typically all content reviews submitted by all users are displayed in one aggregate pool without regard for the individual differences in preference and viewpoints between different types of users. This significantly diminishes the value of content reviews because users do not know whether users submitting the user reviews share their preferences and sensitivities.

For example, some content such as video games may include a high level of violence which may be unsuitable for certain users such as children. In general, different users will have varying sensitivities or tolerances to particular attributes of content. In another example, the fidelity or quality of the content may be very important to particular users. Quality or fidelity may comprise such aspects as bit rate, resolution, etc. However, different users may differ on what comprises a high fidelity or quality content depending on the sensitivity and idiosyncrasies of those particular users.

Thus, a need exists for a content review system that provides for an evolving classification of content, provides for a high level of trust in content reviews and allows users to peruse reviews with a finer granularity that accounts for community standards of the users submitting the reviews.

SUMMARY

According to exemplary embodiments, a self-adapting classification system ("SACS") generates an evolving classification for content. The classification may commence with a seed review process, which generates a seed review for content. The seed review process may generate a level of trust for initial reviews of the content. Once the seed review is completed and distributed, users may submit content reviews to the SACS in a rolling manner, which allows for an evolving classification of content.

Using the SACS, users may identify themselves with one or more community groups, which identify users having certain shared values, preferences, viewpoints, ideologies, etc. At least one content descriptor may be defined, which indicates an attribute or feature that content may exhibit to a varying extent.

Once the seed review has been received and distributed, users may submit content reviews to the SACS. The reviews are received in a rolling manner, which allows for an evolving classification of content. Each content review may comprise an identified content element, a user identifier for the user submitting the review, a content descriptor and a classification. The content review may then be stored in a content database by storing the identifier of the content element reviewed, an identifier of a community group associated with the user submitting the review, the content descriptor and the classification. If a number of content reviews for a content element with respect to a particular community group and content descriptor stored in the content review database exceed a threshold, an aggregate classification for the content element may be updated.

A filtering engine may allow users to search for content elements having an aggregate classification with respect to a particular content descriptor within a certain range. The filtering engine may return identifiers for content elements having aggregate classifications satisfying the filter query.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

Figure 1A:
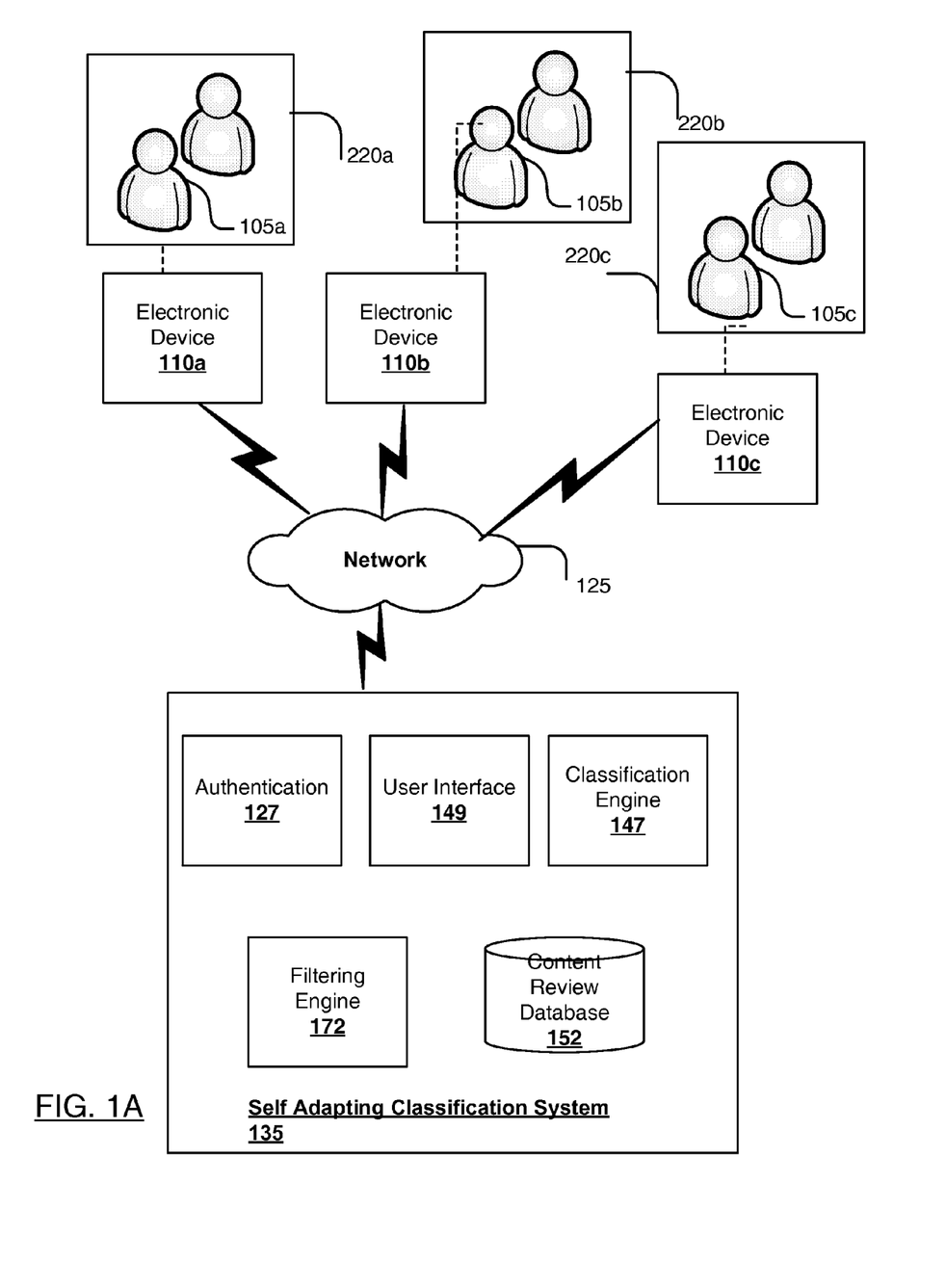
FIG. 1A depicts an example embodiment of a self-adapting classification system in a network environment.

FIG. 1A depicts an example embodiment of a self-adapting classification system ("SACS") in a network environment. FIG. 1A shows users 105a, 105b and 105c interacting with SACS 135. The content being reviewed and classified may comprise any type of digital content such as video games, music, movies, videos or the like. Although FIG. 1A depicts three users 105a-105c interacting with SACS 135, the system is compatible and may be used by any number of users. The content that is classified by SACS 135 may be generated by users 105a-105c submitting content reviews or may be generated by third party entities that are not associated with SACS 135. For example, user 105a may design and distribute a video game that may be reviewed and classified by SACS 135.

Users 105a-105c may each be associated with a respective community group 220a-220c Each community group 220a-220c may define a common reference point of like-minded users. Thus, a community group may include users that share common preference, sensitivities, viewpoints, etc. Community groups 220a-220c may be based, for example, on geographic information, cultural information, nationality information, political information, age information, etc. Exemplary community groups 220a-220c may be "Concerned moms of Sammamish", "Gamers of Nevada", "Gamers of Paris", etc.

Each community group 220a-220c may implicitly or explicitly define its own community standards regarding content. These community standards may be reflected in content reviews submitted by particular users associated with one community group as opposed to another community group. For example, one community group might have a higher tolerance or viewpoint regarding excessive violence in a video game as opposed to another. Thus, content reviews from a particular user would have greater meaning in context with the community standards of the group with which the user is associated.

Each user 105a-105c may be associated with a respective electronic device 110a-110c that allows the user 105a-105c to communicate and exchange information with SACS 135. Each electronic device 110a-110c may include hardware components such as a processor, a graphics card, a storage component such as a disk drive or solid state storage device, a memory component, a memory card reader, an antenna, a communication port, a disc drive, or the like. Electronic devices 110a-110c may each also include software components such as an operating system that may control the hardware components, a user interface, one or more application programs such as web browser software, etc. Electronic devices 110a-110c may also include any other suitable components such that each respective user 105a-105c may exchange information with SACS 135 via network 125. According to example embodiments, electronic devices 110a-110c may each be a computer, video game system, cellular telephone, a PDA, a media player, etc.

Electronic devices 110a-110c may communicate with SACS 135 via network 125 such that each user 105a-105c may exchange information with SACS 135. Network 125 may be any network, such as a Local Area Network ("LAN"), a Wide Area Network ("WAN"), the Internet, etc.

SACS 135 may include authentication module 127, user interface module 149, classification engine 147, filtering engine 172 and content review database 152. Authentication module 127, user interface module 149, user interface module 145, classification engine 147, filtering engine 172 and content review database 152 may be in operative communication with each other via, for example a bus or any other subsystem that may transfer data between computer components such as the modules in SACS 135.

User interface module 149 of SACS 135 may provide a user interface for a user 105 utilizing an electronic device 110 to interact with SACS via network 125. For example, as described in detail below, user interface module 149 may execute processes to receive content reviews of content and cause them to be stored in classification database 152. In particular, where network 125 is the Internet and World Wide Web, user interface module 149 may provide a Web interface that allows a user 105 to interact with SACS 135 and submit and receive information from SACS 135 over the Internet and World Wide Web.

In addition, as described in detail below, user interface module 149 may also receive filter queries from users 105a-105c to perform search and filtering operation on content reviews stored in content review database 152. User interface module 149 may also receive information submitted by users 105a-105c using respective electronic devices 110a-110c over network 125 regarding a community group the user is associated with and cause this information to be stored in content review database 152.

Content review database 152 may store a plurality of content reviews for content, which itself may be stored and distributed by a component remote from SACS 135. Content reviews may pertain to content stored and referenced in a content distribution system. The structure of an exemplary content review is described below with reference to FIGS. 3-4.

Authentication module 127, user interface 149, classification engine 147, filtering engine 172 and content review database 152 comprising SACS 135 may be implemented on a single device or across multiple devices. For example, where network 125 is the Internet, authentication module 127, user interface 149, classification engine 147, filtering engine 172 and content database 152 may be implemented on a single Web server or across multiple Web servers.

User interface module 149 may present an interface to user 105 via electronic device 110. For example, user interface component 149 may provide an interface to handle and control the submission and distribution to SACS 135 of content such as video games, music, movies, videos, or the like that may be received from users 105a-105c using respective electronic device 110a-110c. Thus, according to an example embodiment, user interface module 149 may receive content reviews from users 105a-105c via electronic devices 110a-110c, for example, and may provide a display such as a Web page that allows users 105a-105c to interact effectively with SACS 135.

Authentication module 127 may provide a mechanism for authentication of one or more users 105a-105c of SACS 135. Typically, users 105a-105c may be authenticated by supplying a credential such as an account number, username, Personal Identification Number (PIN), password, or the like before services such as uploading reviews or performing search and filtering operations. Additionally, once a user 105a-105c has been authenticated, SACS 135 may cache the authentication status to prevent unnecessary external authentication requests, for example. Authentication module 127 may also verify whether users 105a-105c may be a registered user or an unregistered user. For example, authentication module 127 may be used to determine whether users 105a-105c may be registered to provide content reviews or solely to perform search and filtering operations. Authentication module 127 may perform the authentication itself. Additionally, authentication module 127 may delegate authentication authority to an authentication mechanism such as a Web-based authentication service. In one embodiment, authentication module 127 may include bridges to various possible points of authentication.

Classification engine 147 may execute processes for performing classification of content with respect to one or more community groups 220 and content descriptors. In particular, classification engine may retrieve content reviews stored in content review database 152 to generate an aggregate classification of content with respect to one or more community groups and content descriptors. An exemplary process performed by classification engine 147 is described below with respect to FIG. 4B.

Search and filtering engine 172 may receive and process filter queries initiated by users 105a-105c of SACS 135. Upon receiving a filter query, filtering engine 172 may retrieve information from content review database 152 regarding content satisfying the filter query. In general, users 105a-105c may desire to search for content having a certain classification range with respect to a particular content descriptor. Users 105a-105c may desire to perform view search results with respect to particular community groups 220 in order understand content reviews a contextual manner that invokes the community standards of particular community groups.

Figure 1B:
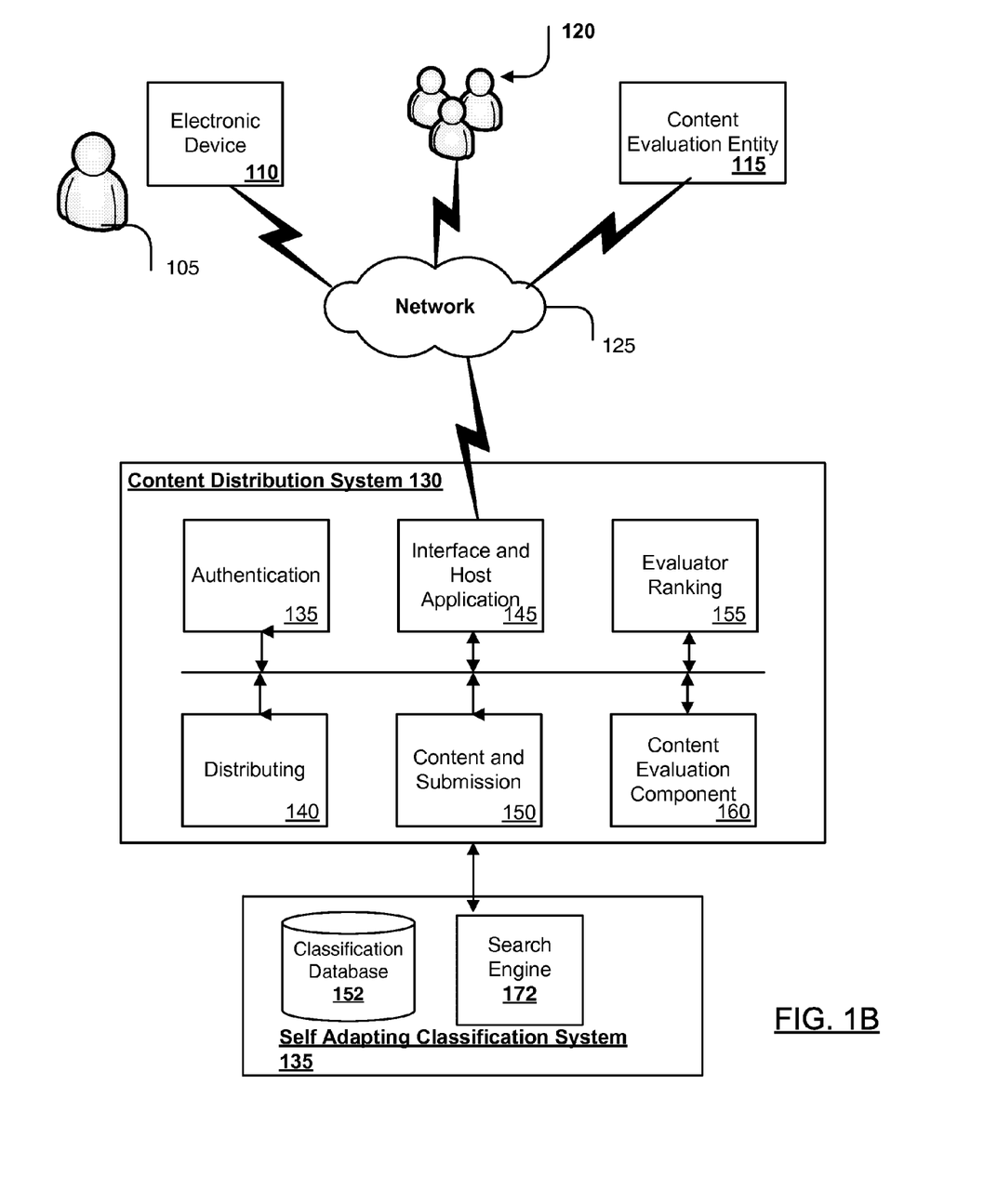
FIG. 1B depicts an alternative embodiment wherein a SACS is deployed to interoperate with a content distribution system 130.

FIG. 1B depicts an alternative embodiment wherein a SACS is deployed to interoperate with a content distribution system 130. In general, content distribution system 130 may operate to receive content generated by one or more users 105. The received content may then be reviewed by the content distribution system 130 and/or rated by a content review group. Based upon the review, content distribution system 130 may determine whether to allow the received content to be publicly accessible to additional users. The content distribution system may establish one or more criteria that may be used to rate the content review group reviewing the received content.

SACS 135 may interoperate with content distribution system 130 to allow users 105 to submit content reviews for content distributed by content review system 130.

Figure 2:
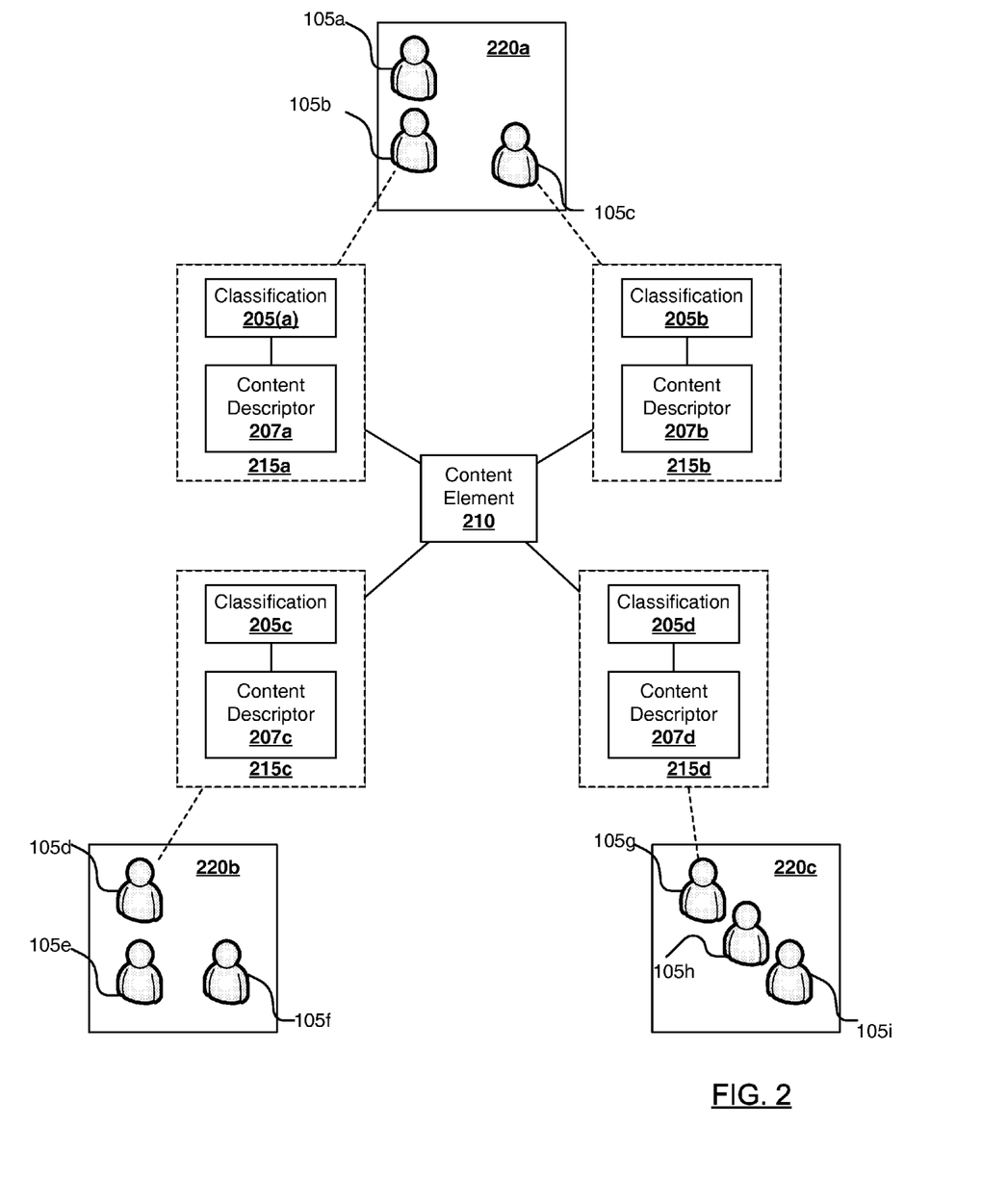
FIG. 2 depicts an exemplary relationship between content reviews, users, community groups and a content element.

FIG. 2 depicts an exemplary relationship between content reviews, users, community groups and a content element. As shown in FIG. 2, users 105a-105c may be associated with community group 220a, users 105d-105f may be associated with community group 220b and users 105g-105i may be associated with community group 220c.

Each content element 210 may be a discrete piece of content such as a video game, a movie, a sound file or any type of media, herein referred to as a "content element". According to one embodiment, a content review may comprise a user identifier of a user submitting the content review, a content descriptor and an associated classification for the content descriptor. The classification may be a quantitative indicator of whether the content may exhibit the content descriptor. For example, the content review may include an indication of a level of violence of content, the maturity of content, the playability of content, the technical difficulty of content such as video games, and/or quality of content such as graphical quality. The content review may be received by SACS 135 and stored in content review database 152 as described in more detail below.

Each content element may be associated with one or more content reviews 215. For example, FIG. 2 shows content element 210 associated with content reviews 215a-215d. Each content review 215a-215d may include a respective content descriptor 207a-207d and respective classification 205a-205d.

Each content descriptor 207a-207d comprising a content review 215 pertains to a feature or attribute of the content element 210 to which it is associated. For example, content descriptors 207a-207d may be "violence", "maturity", "profanity", "fidelity", etc. Content descriptors 207a-207d may be predefined or may be provided by a user of SACS 135.

Each respective classification 205a-205d indicates a degree to which content element 210 exhibits the attribute indicated by respective content descriptor 207a-207d. Thus, for example if content descriptor 207a were "violence", classification 205a would indicate the degree to which content element 210 exhibited violence content from the viewpoint of a particular user 105. Classifications 205a-205d may be any type data, in any type of format and may be for example a numerical value. Thus, in the case where the classification is a numerical value, a "violence" classification of 7 might indicate that a content element 210 exhibited "violence" content to a greater degree than a content element 210 with a "violence" classification of 6 from the same user 105.

As described previously, each content review 215a-215c may be submitted by a user 105 associated with a community group 220. Allowing users 105 to be associated with particular community groups 220a-220c provides the ability to determine contextual information relating to content reviews 215 as each community group 220a-220c may have a different community standard. Thus, for example, a "violence" classification of 3 for a particular user 105 associated with a first community group 220a might not be identical to a "violence" classification of 3 for a second user 105 associated with a second community group 220b.

Although FIG. 2 only shows a single content element 210 associated with content reviews 215a-215d and community groups 220a-220c, it should be understood that the structure shown in FIG. 2 may be generalized to an arbitrary number of content elements 210, content reviews 215 and community groups 220.

Figure 3:
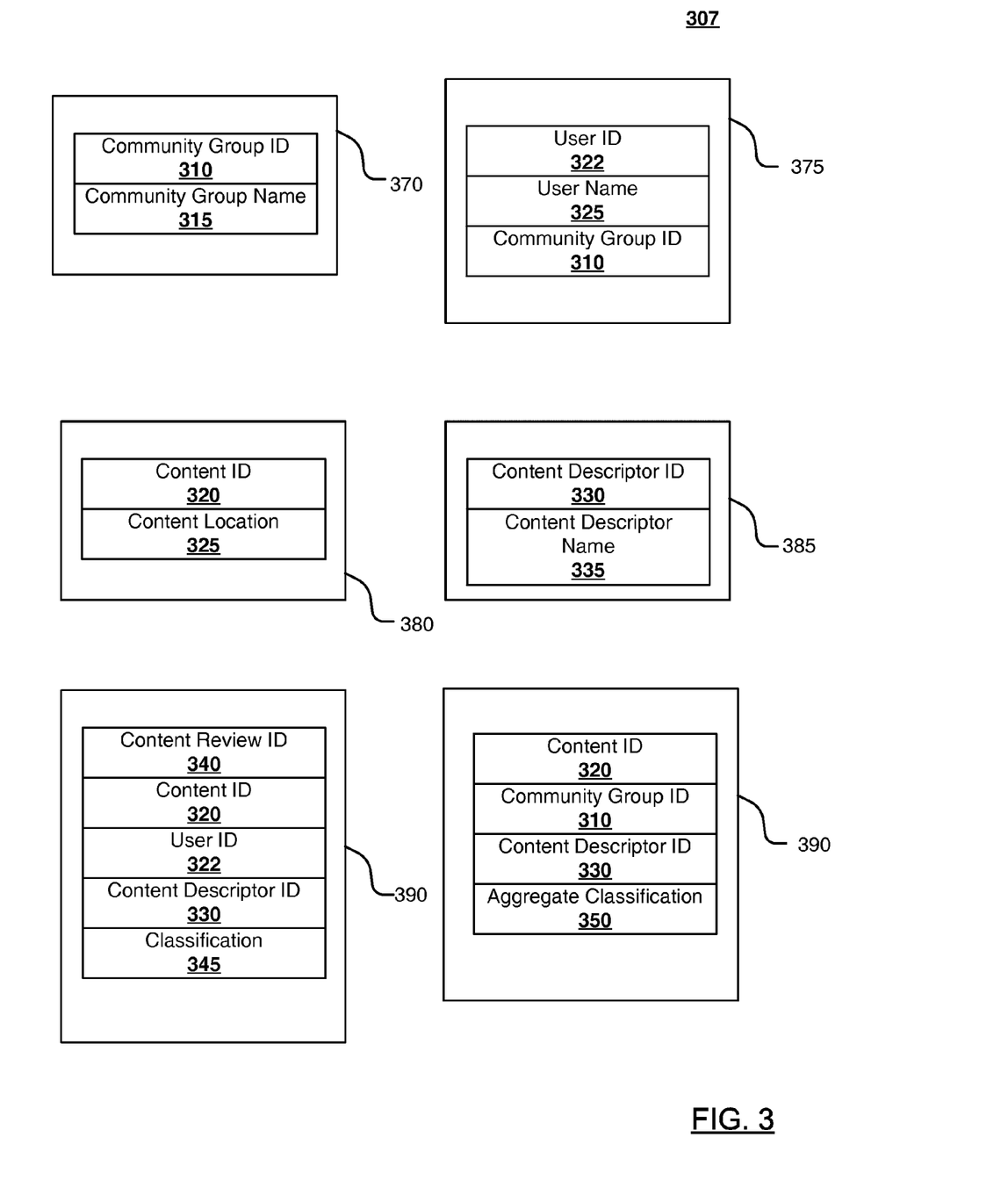
FIG. 3 depicts an exemplary schema for a content review database.

FIG. 3 depicts an exemplary schema for a content review database. The schema 307 may include a community group ID table 370, a user table 375, a content table 380, a content descriptor table 385, a content review table 390 and an aggregate classification table 390.

Community group table 370 may store information relating to community groups, e.g., 220a-220c of FIG. 3, that interact with SACS 135. Community group table 370 may include community group ID field 310 and community group name field 315. Community group field 310 may store a unique identifier for a community group 220. Community group name field 315 may store a name of a community group 220.

User table 375 may store information regarding users 105 and associated community groups 220 of SACS 135. User table 375 may include user ID field 322, username field 325, and community group ID field 310. User ID field 322 stores a unique ID for a user. Username field 325 stores a name for a user. Community group ID field 310 associates a community group with a user by referencing community group ID field 310 from community group table 370.

Content table 380 may store information regarding a content element 210. Content table 380 may include content ID field 320 and content location field 325. Content ID field 320 stores a unique identifier for a content element 210. Content location field 325 stores a pointer or reference to a location of a content element 210, for example on a server or database local or remote to SACS 135.

Content descriptor table 385 may store information regarding content descriptors. As noted with respect to FIG. 2, a content descriptor pertains to a feature or attribute of a content element 210 to which it is associated. Content descriptor table 385 may include a content descriptor ID field 330 and a content descriptor name field 335. Content descriptor ID field 330 may store a unique identifier for a content descriptor. Content descriptor name field 335 may store a name to be associated with a content descriptor. For example, content descriptor names may include "violence", "sexual content", etc.

Content review table 390 may store information regarding content reviews. As described with respect to FIG. 2, a content review may comprise a content descriptor 207 and an associated classification 205. Content review table 390 may include content review ID field 340, content ID field 320, user ID field 322, content descriptor ID field 330 and classification field 345. Content review ID field 340 may store a unique identifier for a content review. Content ID field 320 associates a content review with a particular content element referenced by content ID field 320. User ID field 322 associates a content review with a user indicated by a user ID from user table 375. Content descriptor ID field 330 associates a content review with a content descriptor from content descriptor table 385. Classification field 345 stores a classification as viewed by a user submitting the content review for a content element 210 with respect to a content descriptor 207. Classification field 345 stores a numerical value or alternatively a text string indicating the degree to which a user views a content element as exhibiting a content descriptor in the content review.

Aggregate classification table 390 may store information regarding an aggregate classification for a content element 210 with respect to a content descriptor 207 and a community group 220. Aggregate classification table 390 may include content ID field 320, community group ID field 310, content descriptor ID field 330 and aggregate classification field 350. Content ID field 320 stores a content identifier for a content element. Community group ID field 310 stores a community group identifier for an aggregate classification for a content element. Content descriptor ID field 330 stores an identifier for a content descriptor for the aggregate classification. Aggregate classification field 350 stores a numerical value indicating in aggregate classification for a content element with respect to a particular content descriptor as determined by a community group. Aggregate classification field 350 may store a numerical value or alternatively text information indicating a relative classification such as "low", "medium" or "high". Aggregate classification field 350 may store an average of all classification values submitted for a content element 210 with respect to a particular content descriptor for a community group.

Figure 4A:
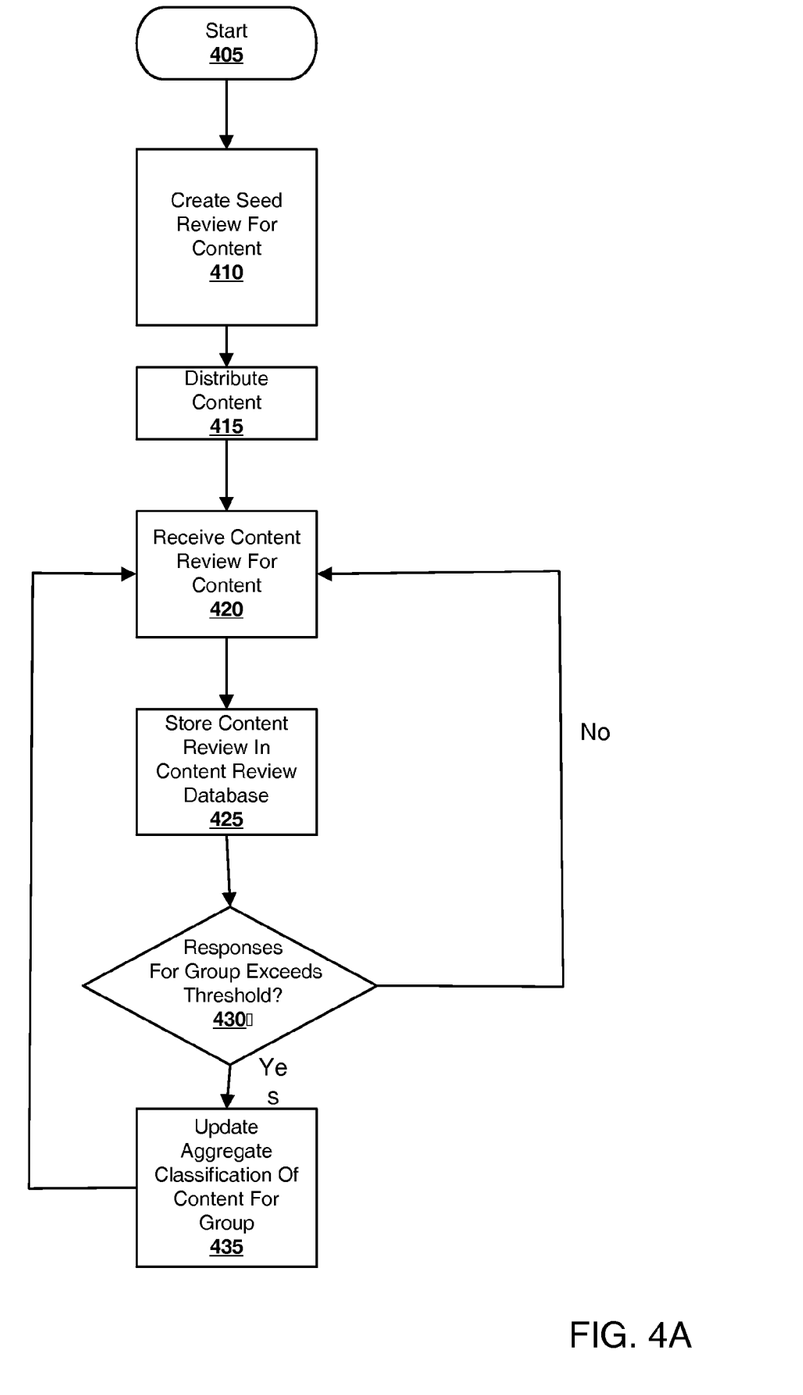
FIG. 4A is a flowchart of a process for receiving and storing a content review.

FIG. 4A is a flowchart of a process for receiving and storing a content review. The process depicted in FIG. 4A may, for example, be executed by classification engine 147 in conjunction with content review database 152 as part of a process for receiving and archiving content reviews. In 405, the process commences. In 410, a seed review is created for a content element 210. A seed review provides an initial classification for a content element. An exemplary process for creating a seed review is described below with reference to FIG. 4B.

In 420, a content review for a content element 210 is received at SACS 135. The content review 210 may be submitted by a user 105 using an electronic device 110 over network 125. According to one embodiment where network 125 is the Internet, user 105 may submit a content review by logging onto SACS 135 (e.g., using a browser on electronic device 110) via user interface 145 and authentication module 127 on SACS. The user 105 may then be presented with an HTML ("Hypertext Markup Language") form that may allow the user 105 to submit a content review.

In 425, the received content review 215 is stored in content review database 152 using, for example, the schema shown in FIG. 3. In step 430, it is determined whether a number of responses for a community group for a content element 210 with respect to particular content descriptor exceeded a given threshold. The threshold may be a predetermined value stored at SACS 135. If not ('No' branch of 430), flow continues with 420. If so ('Yes' branch of 430), flow continues with 435 and the aggregate classification for a community group for the content element is adjusted. This adjustment may comprise calculating an average of all classifications submitted for the content element 210 by a community group with respect to a content descriptor. Flow then continues with 420.

Figure 4B:
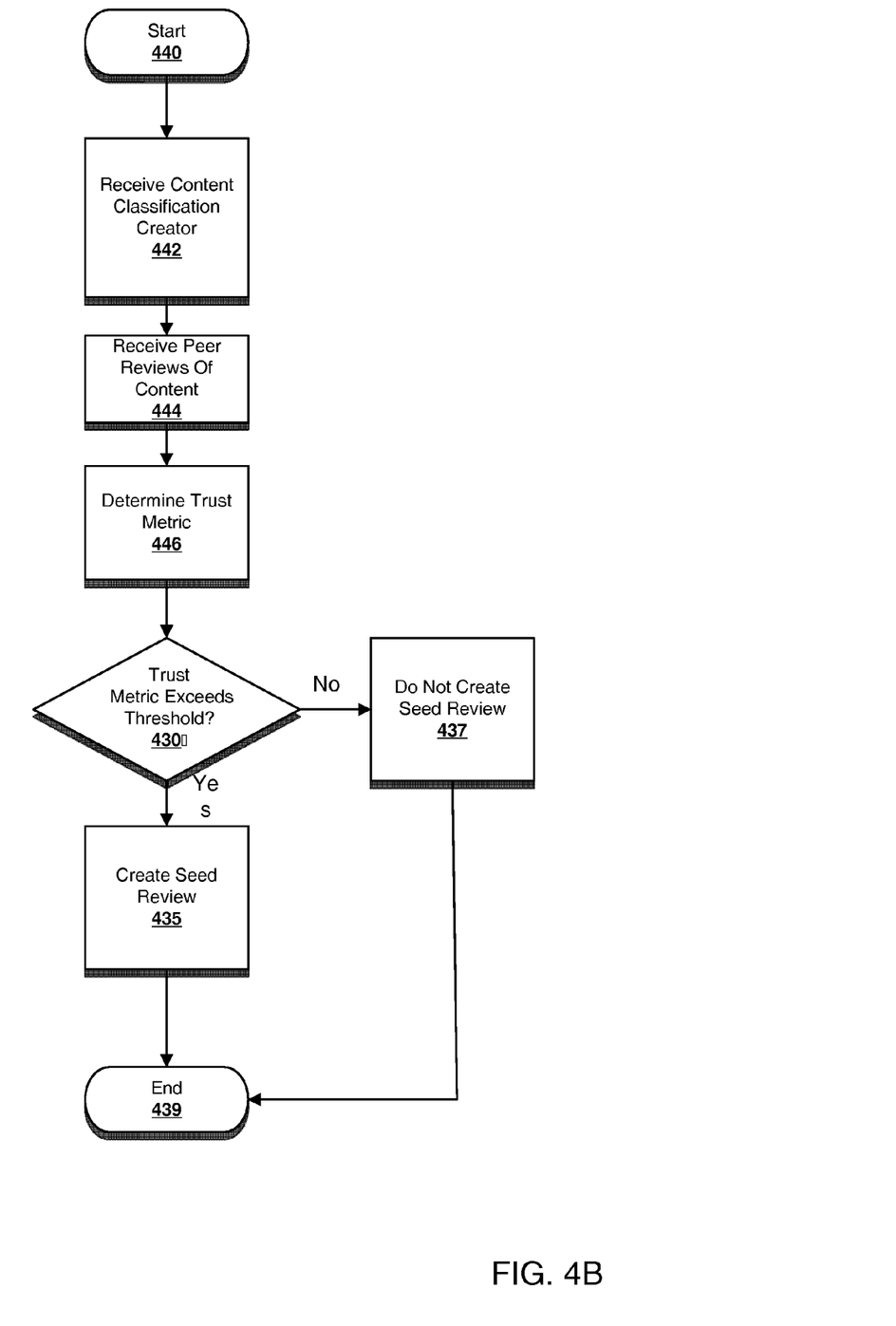
FIG. 4B is a flowchart that depicts a process for creating a seed review. The process is initiated in 440.

According to one embodiment, as described in FIG. 4A, before an evolving classification process is initiated, a seed review for content is created. When a creator of content submits the content, for example to a content distribution system 130, the creator may submit an assessment or review of the content relating to particular attributes of the content. A seed review is an initial review process that creates a higher level of trust for an initial assessment of content than had the creator of the content submit an assessment without checks. A seed review may form an initial basis score for a rolling or self-evolving classification for content FIG. 4B is a flowchart that depicts a process for creating a seed review. The process is initiated in 440. In 442, content classifications may be received from a creator to assign classifications to content submitted on a Web site or a closed console marketplace system. In 444, peer evaluations of content may be received from a selected community of peer reviewers to input their evaluation of content in confirmation or disagreement with the creator assessment. In 446, a trust metric regarding disagreement among the reviewers and the creator of the content is determined by comparing the peer evaluations with the classification submitted by the creator. In 430, it is determined whether the trust metric exceeds a threshold indicating agreement between the peer reviews and creator review. If so ('yes' branch of 430), in 435, the seed review is created. Otherwise ('no' branch of 430), in 437, the seed review is not created. The process ends in 439.

Figure 4C:
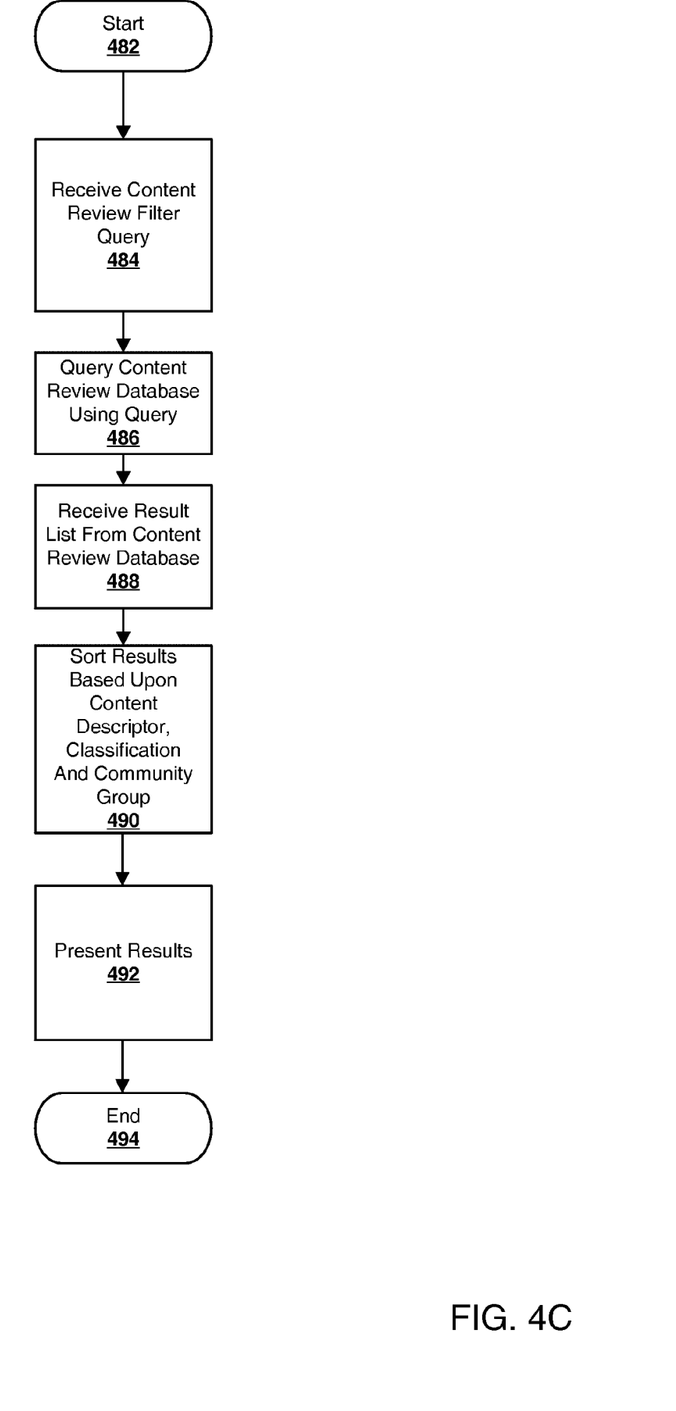
FIG. 4C is a flowchart that depicts a process for performing a search and filtering operation on content review data.

FIG. 4C is a flowchart that depicts a process for performing a search and filtering operation on content review data. The process is initiated in 482. In 484, a content review filter query is received. According to one embodiment, a filter query may specify at least one content descriptor and an aggregate classification range for each content descriptor. Filter queries may involve Boolean expressions, for example, that specify multiple content descriptors and associated aggregate classification ranges. In 486, content review database 152 may be queried using the filter query. In 488, a result list is received from content review database 152 that indicates content elements satisfying the filter query. In 490, the results list may be sorted based upon content descriptor, aggregate classification and community group. In 492, the sorted results list may be presented to the use submitting the filter query, for example, via user interface 149. The process ends in 494.

Figure 4D:
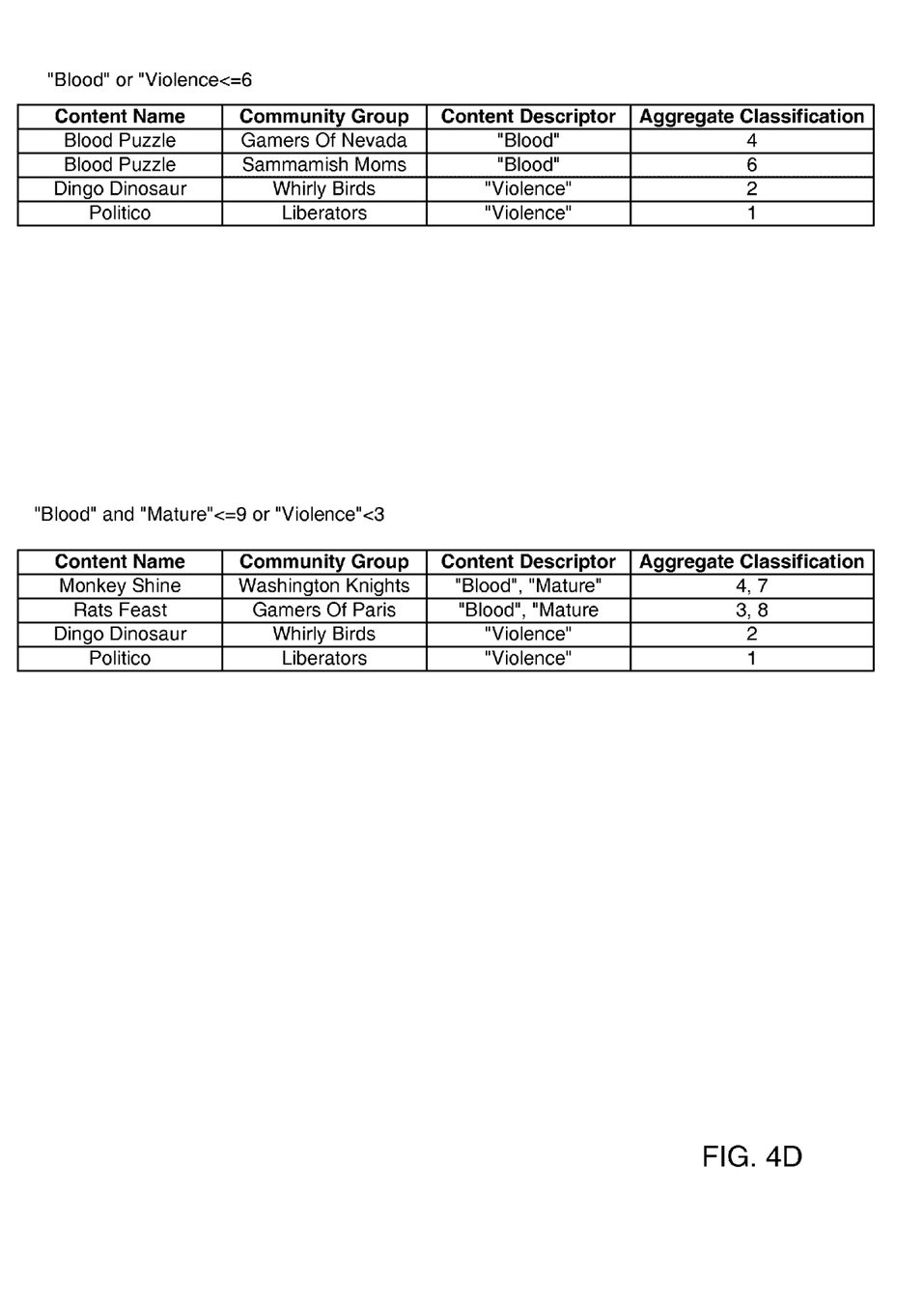
FIG. 4D illustrates two exemplary filter queries and possible results.

FIG. 4D illustrates two exemplary filter queries and possible results. A first filter query "Blood" or "Violence"<6 requests content elements having either "Blood" or "Violence" content descriptors having an aggregate classification <6. As shown in the filter query presented results, "Blood Puzzle" has a "Blood" rating <6 for both the community groups "Gamers Of Nevada" and "Sammamish Moms" while both "Dingo Dinosaur" and "Politico" have "Violence" ratings <6.

A second filter query specifies "Blood" and "Mature"<=9 and "Violence"<3 indicating that both "Blood" and "Mature" aggregate classifications should be <=9 while "Violence" aggregate classifications must be <3. As shown in the exemplary filter query results both "Monkey Shine" and "Rats Feast" have both "Blood" and "Mature" aggregate classification range respectively by "Washington Knights" and "Gamers Of Paris". Because "Dingo Dinosaur" and "Politico" do not yet have "Mature" reviews and those content elements have "Violence" aggregate classifications <3, they may be returned as well.

Figure 5:
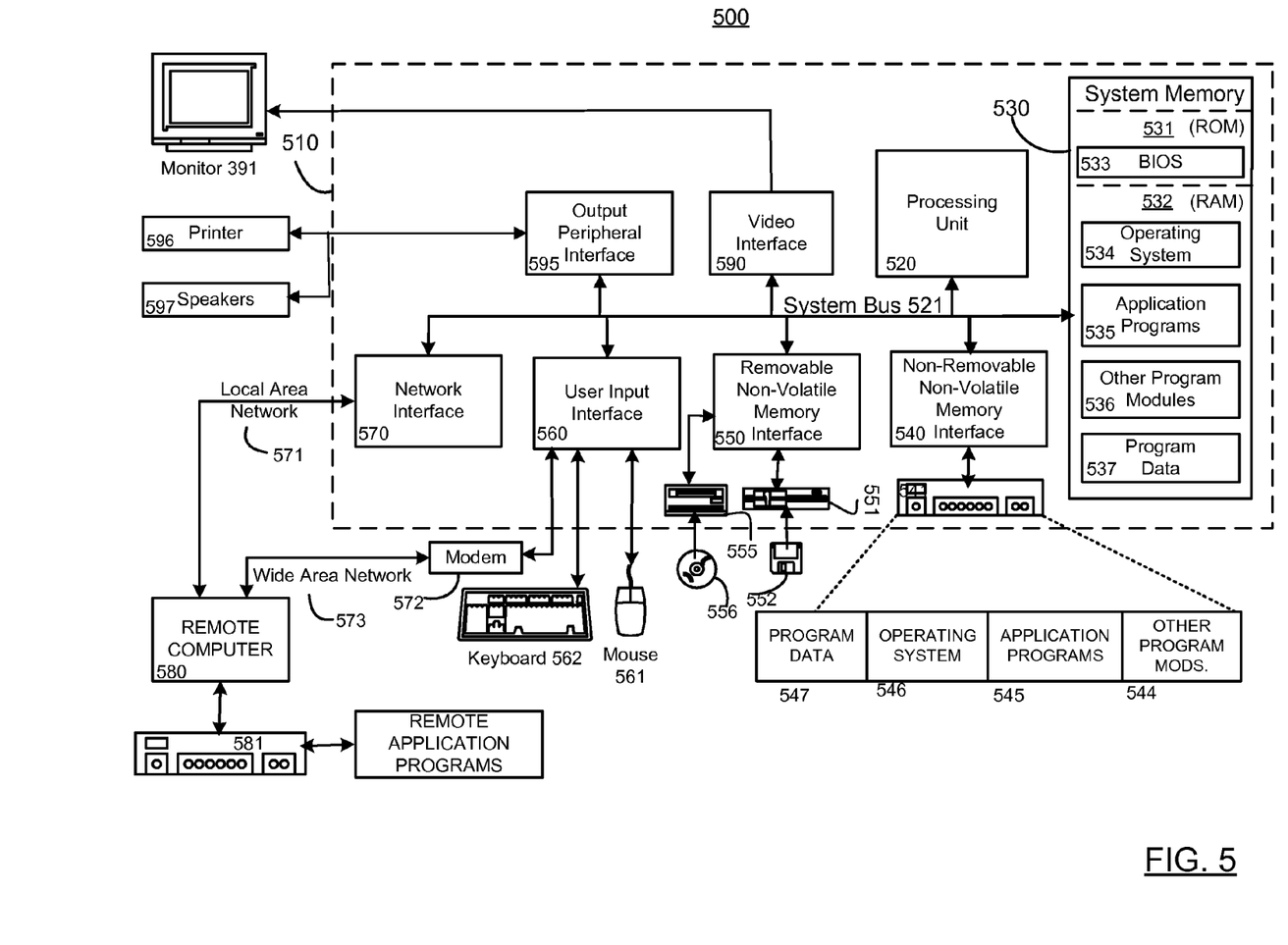
FIG. 5 shows an exemplary computing environment in which aspects of the example embodiments may be implemented.

FIG. 5 shows an exemplary computing environment in which aspects of the example embodiments may be implemented. Computing system environment 500 is only one example of a suitable computing environment and is not intended to suggest any limitation as to the scope of use or functionality of the described example embodiments. Neither should computing environment 500 be interpreted as having any dependency or requirement relating to any one or combination of components illustrated in exemplary computing environment 500.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the example embodiments includes a general purpose computing device in the form of a computer 510. Components of computer 510 may include, but are not limited to, a processing unit 520, a system memory 530, and a system bus 521 that couples various system components including the system memory to processing unit 520. Processing unit 520 may represent multiple logical processing units such as those supported on a multi-threaded processor. System bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 521 may also be implemented as a point-to-point connection, switching fabric, or the like, among the communicating devices.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Computer 510 may also include other removable/non-removable, volatile/nonvolatile computer storage media. By way of example only, FIG. 6 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 541 is typically connected to system bus 521 through a non-removable memory interface such as interface 540, and magnetic disk drive 551 and optical disk drive 555 are typically connected to system bus 521 by a removable memory interface, such as interface 550.

The drives and their associated computer storage media discussed above and illustrated in FIG. 5, provide storage of computer readable instructions, data structures, program modules and other data for computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to processing unit 520 through a user input interface 560 that is coupled to the system bus, but may be connected by other interface and bus structures, such as a parallel port, game port or a universal serial bus (USB). A monitor 591 or other type of display device is also connected to system bus 521 via an interface, such as a video interface 590. In addition to the monitor, computers may also include other peripheral output devices such as speakers 597 and printer 596, which may be connected through an output peripheral interface 595.

Computer 510 may operate in a networked environment using logical connections to one or more remote computers, such as a remote computer 580. Remote computer 580 may be a personal computer, a server, a router, a network PC, a peer device or other common network node, and typically includes many or all of the elements described above relative to computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, computer 510 is connected to LAN 571 through a network interface or adapter 570. When used in a WAN networking environment, computer 510 typically includes a modem 572 or other means for establishing communications over WAN 573, such as the Internet. Modem 572, which may be internal or external, may be connected to system bus 521 via user input interface 560, or other appropriate mechanism. In a networked environment, program modules depicted relative to computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Computing environment 500 typically includes at least some form of computer readable media. Computer readable media can be any available media that can be accessed by computing environment 500. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

What is claimed:

1. A computer-readable storage device having stored thereon computer-readable instructions for reviewing content provided by a content distribution system, the computer-readable instructions comprising instructions for:
    defining a plurality of content descriptors, wherein each content descriptor pertains to a content feature;
    generating a seed review as a function of a review of a content element by a creator of the content element, at least one peer review of the content element by at least one peer reviewer, and a trust metric regarding disagreement among the at least one peer reviewer and the creator;
    receiving a content review from a user associated with a community group of a plurality of community groups, wherein the content review indicates the content element and at least one user classification for each of at least one respective content descriptor, the at least one user classification comprising a numeric value relative to a community standard of the community group associated with the user;
    storing each of the at least one user classification, respective at least one content descriptor and the community group associated with the user in a database such that the at least one user classification, respective at least one content descriptor and the community group associated with the user is associated with the content element; and
    if a number of content reviews provided by the community group associated with the user concerning the content element and a particular content descriptor exceeds a threshold, updating an aggregate classification of the content element for the particular content descriptor and the community group associated with the user by averaging user classifications for the particular content descriptor and the community group associated with the user.

2. The computer-readable storage device of claim 1, wherein the computer-readable instructions further comprise instructions for:
    distributing the seed review and the content element.

3. The computer-readable storage device of claim 2, wherein the seed review comprises an initial review for the content and the seed review is created if the at least one peer review is sufficiently in agreement with the review of the content element by the creator of the content element.

4. The computer-readable storage device of claim 1, wherein the respective at least one content descriptor pertains to at least one of violence of content, maturity of content, playability of content, technical difficulty or quality of content.

5. The computer-readable storage device of claim 1, wherein the community group associated with the user is based upon one of geographic information, cultural information, nationality information, political information, and age information.

6. A method for reviewing content, the method comprising:
- defining a plurality of content descriptors, wherein each content descriptor pertains to a content feature;
- generating a seed review as a function of a review of a content element by a creator of the content element, at least one peer review of the content element by at least one peer reviewer, and a trust metric regarding disagreement among the at least one peer reviewer and the creator;
- receiving a content review from a user associated with a community group of a plurality of community groups, wherein the content review indicates the content element and at least one user classification for each of at least one respective content descriptor, the at least one user classification comprising a numeric value relative to a community standard of the community group associated with the user;
- storing each of the at least one user classification, respective at least one content descriptor and the community group associated with the user in a database such that the at least one user classification, respective at least one content descriptor and the community group associated with the user is associated with the content element; and
- if a number of content reviews provided by the community group associated with the user concerning the content element and a particular content descriptor exceeds a threshold, updating an aggregate classification of the content element for the particular content descriptor and the community group associated with the user by averaging user classifications for the particular content descriptor and the community group associated with the user.

7. The method of claim 6, further comprising:
distributing the seed review and the content element.

8. The method of claim 7, wherein the seed review comprises an initial review for the content and the seed review is created if the at least one peer review is sufficiently in agreement with the review of the content element by the creator of the content element.

9. The method of claim 6, wherein the respective at least one content descriptor pertains to at least one of violence of content, maturity of content, playability of content, technical difficulty or quality of content.

10. The method of claim 6, wherein the community group associated with the user is based upon one of geographic information, cultural information, nationality information, political information, and age information.

11. A system for reviewing content, the system comprising:
one or more processors; and
one or more memories having stored therein instructions that, upon execution by the one or more processors, cause the system to perform operations comprising:
- defining a plurality of content descriptors, wherein each content descriptor pertains to a content feature;
- generating a seed review as a function of a review of a content element by a creator of the content element, at least one peer review of the content element by at least one peer reviewer, and a trust metric regarding disagreement among the at least one peer reviewer and the creator;
- receiving a content review from a user associated with a community group of a plurality of community groups, wherein the content review indicates the content element and at least one user classification for each of at least one respective content descriptor, the at least one user classification comprising a numeric value relative to a community standard of the community group associated with the user;
- storing each of the at least one user classification, respective at least one content descriptor and the community group associated with the user in a database such that the at least one user classification, respective at least one content descriptor and the community group associated with the user is associated with the content element; and
- if a number of content reviews provided by the community group associated with the user concerning the content element and a particular content descriptor exceeds a threshold, updating an aggregate classification of the content element for the particular content descriptor and the community group associated with the user by averaging user classifications for the particular content descriptor and the community group associated with the user.

12. The system of claim 11, wherein the operations further comprise:
distributing the seed review and the content element.

13. The system of claim 12, wherein the seed review comprises an initial review for the content and the seed review is created if the at least one peer review is sufficiently in agreement with the review of the content element by the creator of the content element.

14. The system of claim 11, wherein the respective at least one content descriptor pertains to at least one of violence of content, maturity of content, playability of content, technical difficulty or quality of content.

15. The system of claim 11, wherein the community group associated with the user is based upon one of geographic information, cultural information, nationality information, political information, and age information.

\* \* \* \* \*